(12) United States Patent
Shimokawa et al.

(10) Patent No.: US 12,517,075 B2
(45) Date of Patent: Jan. 6, 2026

(54) PLANT WATER CONTENT SENSOR AND PLANT WATER CONTENT MEASURING METHOD

(71) Applicant: National University Corporation Kagawa University, Takamatsu (JP)

(72) Inventors: Fusao Shimokawa, Takamatsu (JP); Fumiya Ino, Takamatsu (JP)

(73) Assignee: National University Corporation Kagawa University, Takamatsu (JP)

( * ) Notice: Subject to any disclaimer, the term of this patent is extended or adjusted under 35 U.S.C. 154(b) by 112 days.

(21) Appl. No.: 18/022,127

(22) PCT Filed: Aug. 2, 2021

(86) PCT No.: PCT/JP2021/028568
§ 371 (c)(1),
(2) Date: Feb. 17, 2023

(87) PCT Pub. No.: WO2022/039007
PCT Pub. Date: Feb. 24, 2022

(65) Prior Publication Data
US 2023/0304952 A1  Sep. 28, 2023

(30) Foreign Application Priority Data
Aug. 18, 2020 (JP) ................................ 2020-138022

(51) Int. Cl.
*G01N 27/04* (2006.01)
(52) U.S. Cl.
CPC ................................ *G01N 27/048* (2013.01)
(58) Field of Classification Search
CPC ............... G01N 27/414; G01N 27/416; G01N 33/0098; G01N 27/07; G01N 2333/415;
(Continued)

(56) References Cited

U.S. PATENT DOCUMENTS 5,418,466 A * 5/1995 Watson ................... G01N 27/02
                                                          324/668
5,621,669 A    4/1997 Bjornsson
                (Continued)

FOREIGN PATENT DOCUMENTS

CN      101010581 A    8/2007
CN      106932447 A    7/2017
                (Continued)

OTHER PUBLICATIONS

International Search Report in corresponding International Application PCT/JP2021/028568, dated Oct. 19, 2021, pp. 1-6, Japan Patent Office.
(Continued)

*Primary Examiner* — Eman A Alkafawi
*Assistant Examiner* — Suresh K Rajaputra
(74) *Attorney, Agent, or Firm* — Modal PLLC

(57) ABSTRACT

Provided are a plant water content sensor and a plant water content measuring method configured to measure a water content of a plant in a non-destructive manner. A plant water content sensor includes a water content probe, which includes a readout electrode pair made of a pair of electrodes disposed at a predetermined interval thereof, a water sensitive film, which is bridged across the pair of electrodes, and a supporting portion, which supports the water content probe. A water content of the plant is measurable by sticking the water content probe into the plant and reading out impedance or an electrostatic capacity from the readout electrode pair.

12 Claims, 12 Drawing Sheets

(58) Field of Classification Search
CPC .. G01N 27/048; G01N 27/046; G01N 27/223; A01G 7/00
See application file for complete search history.

(56) References Cited

U.S. PATENT DOCUMENTS

| | | |
|---|---|---|
| 7,552,635 B2 | 6/2009 | Chang et al. |
| 2007/0241756 A1 | 10/2007 | Mizukami et al. |
| 2013/0134994 A1* | 5/2013 | Futagawa ............ G01N 33/182 324/694 |
| 2013/0200905 A1* | 8/2013 | Rhodes ................ G01N 33/246 324/667 |
| 2014/0109658 A1 | 4/2014 | Kah, Jr. |
| 2016/0178553 A1* | 6/2016 | Bommarito .......... G01N 27/225 73/335.04 |
| 2017/0010296 A1* | 1/2017 | Shimokawa ............. A01G 7/00 |
| 2019/0086354 A1* | 3/2019 | Yoo ...................... G01N 27/225 |
| 2019/0274259 A1* | 9/2019 | Shimokawa ....... G01N 33/0098 |
| 2021/0140908 A1* | 5/2021 | Van Houweling ..... G01N 33/24 |
| 2021/0223226 A1* | 7/2021 | Grabbert ................ G01N 21/31 |
| 2022/0187113 A1 | 6/2022 | Lee et al. |

FOREIGN PATENT DOCUMENTS

| | | |
|---|---|---|
| JP | S51-16995 A | 2/1976 |
| JP | S62-285054 A | 12/1987 |
| JP | 2010-266324 A | 11/2010 |
| JP | 2011-027458 A | 2/2011 |
| JP | 2014-211407 A | 11/2014 |
| JP | 2015145810 A | 8/2015 |
| JP | 2016-170070 A | 9/2016 |
| JP | 107796854 A | 3/2018 |
| JP | 2018-128428 A | 8/2018 |
| KR | 101495666 B1 | 2/2015 |
| KR | 10-2016-0096748 A | 8/2016 |
| KR | 10-2018-0038206 A | 4/2018 |
| KR | 10-2054429 B1 | 12/2019 |
| WO | 01/42775 A1 | 6/2001 |
| WO | 2017-123010 A1 | 7/2017 |
| WO | 2018079186 A1 | 5/2018 |

OTHER PUBLICATIONS

Takahashi Nobuhide et al., A relationship of electrical impedance to water status of plant, 48th Proceedings of Japan Joint Automatic Control Conference, 2005, pp. 499-500, Nagano, Japan.
International Preliminary Report on Patentability in corresponding International Application PCT/JP2021/028568, dated Oct. 4, 2022, pp. 1-3, Japan Patent Office.
Search Report in counterpart Chinese patent application 2021800555380, Mar. 20, 2025, 6 pages, CNIPA.

* cited by examiner

PLANT WATER CONTENT SENSOR AND PLANT WATER CONTENT MEASURING METHOD

BACKGROUND

Technical Field

The present invention relates to a plant water content sensor and a plant water content measuring method. In further detail, the present invention relates to a sensor and a method used in measuring a water content of a plant.

Background Art

In production of crops and tree-fruits, sprinkling water and supplying nutrients at appropriate timings in accordance with growing conditions of plants are preferred from an aspect of productivity. However, in many agricultural sites, water sprinkling and supply of nutrients are performed through experience and intuition based on the number of days of no rainfall or the like at present. The method depending on the experience requires proficiency and takes a labor and time. Additionally, since indexes for criteria are based on personal experience, it is difficult for every person to easily perform the method.

Recently, a movement of introduction of information technology, such as Smart Agriculture, to agriculture becomes active. With the information technology, it is expected to perform optimal production based on biological information of plants without depending on a person.

Plant biological information necessary for irrigation management includes a vascular sap flow rate and a water content. In particular, in improving productivity and quality of crops and tree-fruits, it is important to measure a vascular sap flow rate and a water content in a fine point of a plant, such as a distal end of a new branch and a pedicel of a plant. Among these, for the vascular sap flow rate in the fine point of the plant, the inventors of the present application have already proposed a sensor that measures the vascular sap flow rate (Patent Document 1).

Patent Document 1: JP-A-2015-145810

BRIEF SUMMARY

On the other hand, for a method for measuring a water content of an herbaceous plant, there has only been known a destructive method that grinds down the plant and measures a water content from a weight change between before and after heat-drying as of now. Accordingly, it is not possible to measure a water content of a plant while the plant is grown.

The present invention has been made in consideration of the above-described circumstances, and it is an object of the present invention to provide a plant water content sensor and a plant water content measuring method configured to measure a water content of a plant in a non-destructive manner.

A plant water content sensor of a first aspect includes a water content probe, an electrical conductivity probe, and a supporting portion. The water content probe includes a readout electrode pair made of a pair of electrodes disposed at a predetermined interval thereof, and a water sensitive film bridged across the pair of electrodes. The electrical conductivity probe includes an electrical conductivity electrode pair made of a pair of electrodes disposed at a predetermined interval thereof. The supporting portion supports the water content probe and the electrical conductivity probe arranged in parallel.

A plant water content sensor of a second aspect, which is in the first aspect, includes a temperature probe that includes a temperature sensor. The temperature probe is arranged in parallel with the water content probe and supported by the supporting portion.

In a plant water content sensor of a third aspect, which is in the first or second aspects, the water sensitive film is formed of polyimide.

In a plant water content sensor of a fourth aspect, which is in any of the first to third aspects, the water sensitive film has a hydrophilically treated surface.

In a plant water content sensor of a fifth aspect, which is in any of the first to fourth aspects, the water sensitive film is disposed from a location of the readout electrode pair to a base end portion of the water content probe.

In a plant water content sensor of a sixth aspect, which is in any of the first to fifth aspects, the water content probe has a tip angle of 40° to 60°.

In a plant water content sensor of a seventh aspect, which is in the first aspect, the electrical conductivity probe has a plurality of the electrical conductivity electrode pairs, and the plurality of electrical conductivity electrode pairs are disposed to be arranged in an axial direction of the electrical conductivity probe.

A plant water content sensor of an eighth aspect, which is in the second aspect, includes a heater-equipped temperature probe that includes a temperature sensor and a heater. The heater-equipped temperature probe is arranged in parallel with the temperature probe and supported by the supporting portion.

A plant water content measuring method of a ninth aspect includes sticking a water content probe into a plant, the water content probe including a readout electrode pair made of a pair of electrodes disposed at a predetermined interval thereof, and a water sensitive film bridged across the pair of electrodes; sticking an electrical conductivity probe into the plant, the electrical conductivity probe including an electrical conductivity electrode pair made of a pair of electrodes disposed at a predetermined interval thereof; determining an electrical conductivity from an electrical resistance between the pair of electrodes constituting the electrical conductivity electrode pair; determining a sensor sensitivity coefficient B in Formula (1) from an electrical conductivity measurement value; measuring impedance between the pair of electrodes constituting the readout electrode pair; and determining a water content of the plant from an impedance measurement value based on Formula (1), $$Z = Z_0 \times 10^{-B \cdot WC} \tag{1}$$

here, $Z$ indicates an impedance measurement value, $Z_0$ indicates an impedance when no water is absorbed by the water sensitive film, and $WC$ indicates a water content.

In a plant water content measuring method of a tenth aspect, which is in the ninth aspect, the sensor sensitivity coefficient B is determined from the electrical conductivity measurement value based on Formula (2), $$B = a\sigma + b \tag{2}$$

here, $\sigma$ indicates an electrical conductivity, and a and b indicate coefficients determined in advance.

According to the first aspect, by sticking the water content probe into the plant and reading out the impedance or the electrostatic capacity from the readout electrode pair, the water content of the plant can be measured.

Additionally, by compensating the water content measurement value based on the electrical conductivity of the water in the plant measured by the electrical conductivity probe, the water content of the plant can be accurately measured.

According to the second aspect, by compensating the water content measurement value or the electrical conductivity measurement value based on the temperature of the water in the plant measured by the temperature probe, the water content of the plant can be accurately measured.

According to the third aspect, since the water sensitive film is formed of polyimide and the water sensitive film is hardly dissolvable in the water in the plant, a long-term measurement is allowed.

According to the fourth aspect, since the water sensitive film has the hydrophilized surface, the response speed of the water content measurement increases.

According to the fifth aspect, since the water sensitive film is partially disposed outside of the plant, dehydration from the water sensitive film is smoothly performed to increase the response speed when the water content decreases.

According to the sixth aspect, since the water content probe has a sharp tip portion, when the water content probe is stuck into the plant, flow-out of the water in the plant can be inhibited. Therefore, the water content of the plant can be accurately measured.

According to the seventh aspect, since the electrical conductivity electrode pair is disposed to be arranged in the axial direction of the electrical conductivity probe, an electrical conductivity distribution inside the plant is known to allow accurate determination of a position of a xylem.

According to the eighth aspect, since a vascular sap flow rate can be measured in addition to the water content of the plant, the water dynamics of the plant can be multi directionally grasped.

According to the ninth aspect, the water content of the plant can be determined from the impedance read out from the readout electrode pair of the water content probe.

Additionally, by compensating the water content measurement value based on the electrical conductivity of the water in the plant measured with the electrical conductivity probe, the water content of the plant can be accurately measured.

DETAILED DESCRIPTION

Next, embodiments of the present invention will be described based on the drawings.

First Embodiment

A plant water content sensor 1 according to the first embodiment of the present invention can be mounted to a fine point of a plant, such as a distal end of a new branch and a pedicel of a plant. The plant water content sensor 1 has a function of measuring a water content at the fine point of the plant.

(Plant Water Content Sensor)

First, a configuration of the plant water content sensor 1 will be described.

Figure 1:
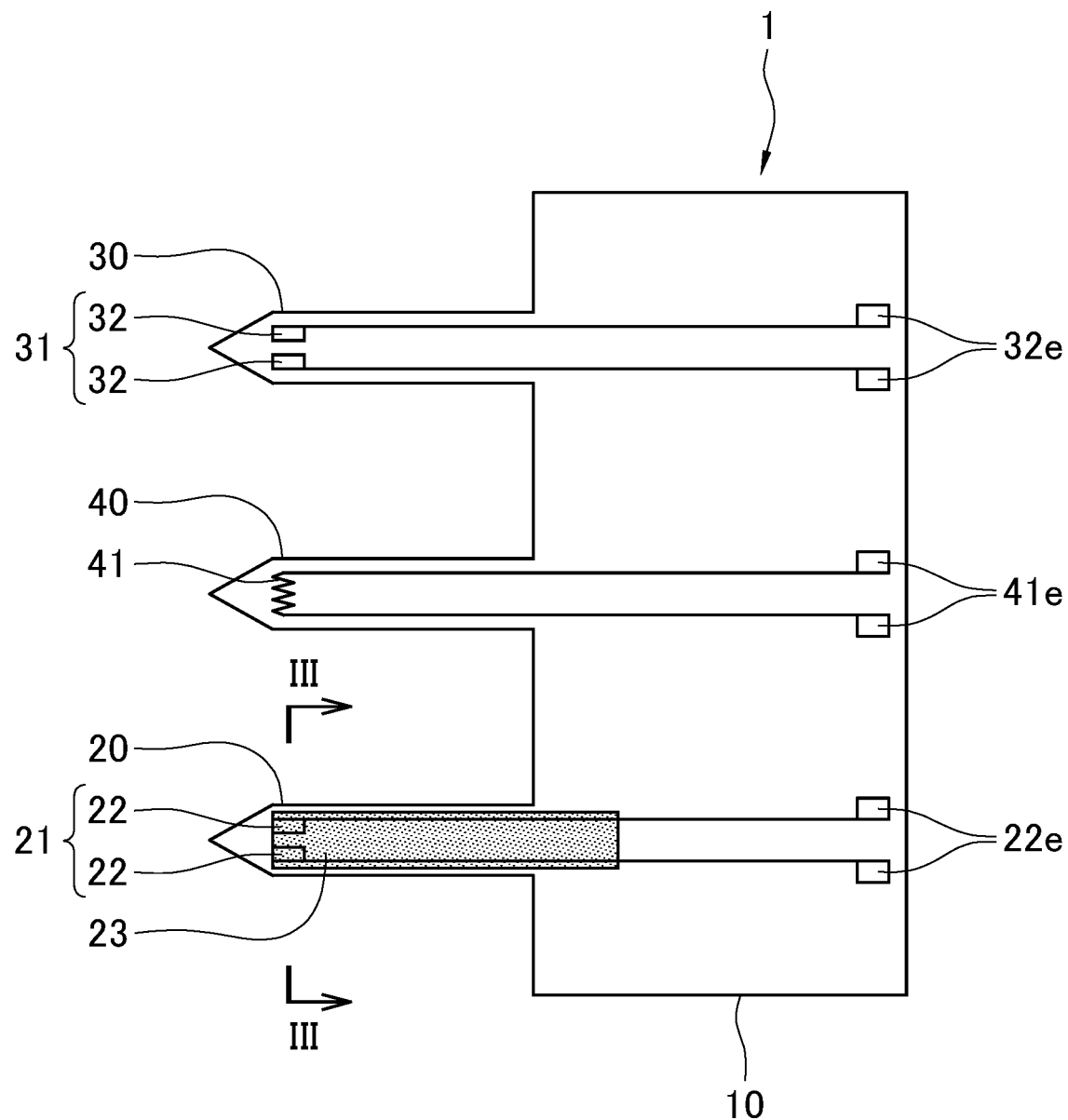
FIG. 1 is a plan view of a plant water content sensor according to a first embodiment.

As illustrated in FIG. 1, the plant water content sensor 1 includes a supporting portion 10. The supporting portion 10 is provided with a water content probe 20, an electrical conductivity probe 30, and a temperature probe 40. Sticking these probes 20, 30, and 40 into a plant attaches the plant water content sensor 1 on the plant.

The water content probe 20 is used for water content measurement of the plant. The electrical conductivity probe 30 is used for electrical conductivity measurement of water in the plant. The measured electrical conductivity is used for compensation of a water content measurement value. Accordingly, for example, when the compensation by electrical conductivity is unnecessary, the plant water content sensor 1 need not include the electrical conductivity probe 30. The temperature probe 40 is used for temperature measurement of the water in the plant. The measured temperature is used for compensation of any one or both of the water content measurement value and an electrical conductivity measurement value. Accordingly, for example, when the compensation by temperature is unnecessary, the plant water content sensor 1 need not include the temperature probe 40.

The probes 20, 30, and 40 are arranged in parallel in the same plane, and the base ends of the probes 20, 30, and 40 are supported by the supporting portion 10. The order of arrangement of the probes 20, 30, and 40 is not specifically limited. However, when both the water content measurement value and the electrical conductivity measurement value are temperature compensated, it is preferred to dispose the temperature probe 40 close to both the water content probe 20 and the electrical conductivity probe 30. That is, it is preferred to dispose the temperature probe 40 between the water content probe 20 and the electrical conductivity probe 30.

The supporting portion 10 and the probes 20, 30, and 40 are formed by processing a semiconductor substrate. Examples of the semiconductor substrate include a silicon substrate and a Silicon on Insulator (SOI) substrate. As the processing of the semiconductor substrate, in addition to photolithography and etching, a MEMS technique using thin film formation, such as sputtering method and evaporation method, is used.

Supporting Portion

The supporting portion 10 is a member supporting the probes 20, 30, and 40. The supporting portion 10 is a plate material having a rectangular shape in plan view and all of the probes 20, 30, and 40 are supported by the long side portion at one side. The supporting portion 10 only needs to have a length in a longitudinal direction such that all of the probes 20, 30, and 40 can be disposed at predetermined intervals. A length in the short side direction of the supporting portion 10 is not specifically limited.

Probe

Each of the probes 20, 30, and 40 is a rod-shaped member and is disposed in a cantilever manner to the edge (the long side portion) of the supporting portion 10. The tip portion of each of the probes 20, 30, and 40 is preferably formed in a pointed shape, such as a triangular shape. The pointed tip portions of the probes 20, 30, and 40 allow decreasing an insertion resistance when the probes 20, 30, and 40 are inserted into the fine point of the plant.

Specifically, it is preferred that each of the probes 20, 30, and 40 has a tip angle of 40° to 60°. Sticking the probes 20, 30, and 40 into the plant sometimes breaks the stuck portion and cells around it, thereby causing the water in the plant to flow out. By the amount of flown-out water, the measurement value of the water content becomes less than the actual state. The shaper the tip portions of the probes 20, 30, and 40 are, the better the flow-out of the water in the plant can be inhibited. When the probes 20, 30, and 40 have tip angles of 60° or less, the tip portions are sufficiently sharp, and therefore, the flow-out of the water in the plant can be inhibited when the plant is stuck. Therefore, the water content of the plant can be accurately measured. On the other hand, excessively decreasing the tip angles of the probes 20, 30, and 40 either fails to ensure the areas for installing elements described below due to thinned widths of the probes 20, 30, and 40 or excessively increases the axial lengths. When the probes 20, 30, and 40 have tip angles of 40° or more, the widths and the lengths of the probes 20, 30, and 40 can be in appropriate dimensions.

Each of the probes 20, 30, and 40 is formed to have dimensions such that each of the probes 20, 30, and 40 can be disposed by being stuck into the fine point of the plant having a stem diameter or an axis diameter of around several mm, such as a distal end of a new branch and a pedicel of the plant. The length of each of the probes 20, 30, and 40 (the length from the base end to the tip in the axial direction) is formed to have a dimension such that the tip portion can be disposed in a xylem or a phloem of the fine point of the plant when each of the probes 20, 30, and 40 is stuck and installed in the fine point of the plant. For example, each of the probes 20, 30, and 40 has the length from 50 to 1,500 μm.

The width of each of the probes 20, 30, and 40 is not specifically limited, but is, for example, from 50 to 500 μm. The shorter the width of the probe 20, 30, or 40 is, the smaller the damage given to the plant can be.

Figure 2:
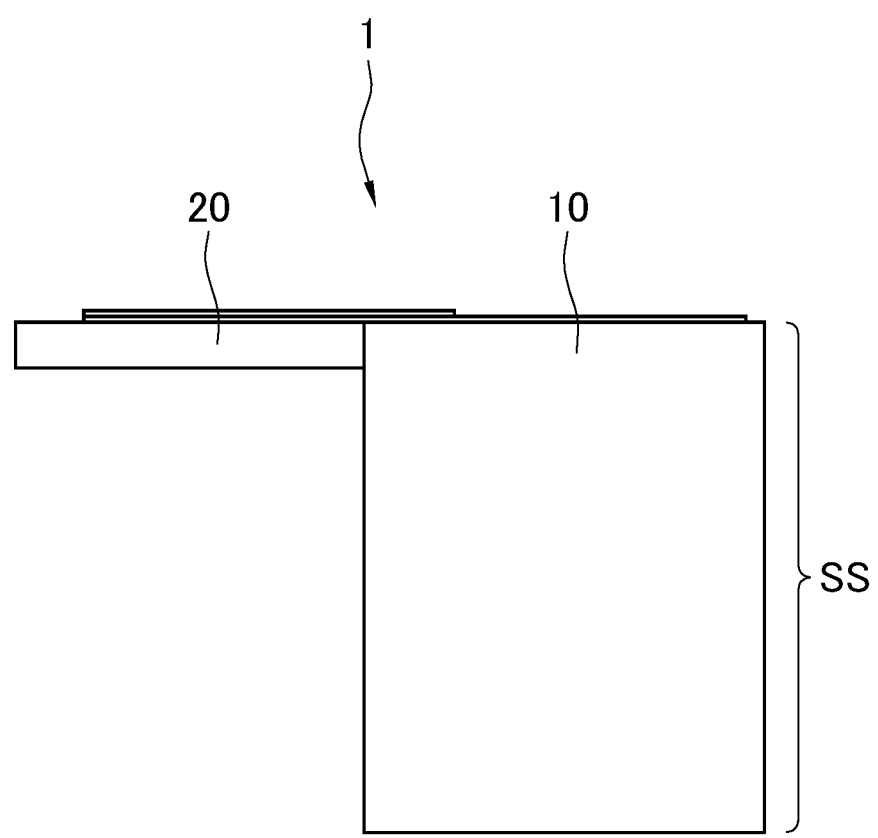
FIG. 2 is a side view of the plant water content sensor according to the first embodiment.

As illustrated in FIG. 2, each of the probes 20, 30, and 40 is formed to be thinner than the thickness of the supporting portion 10 by removing a lower portion of a semiconductor substrate SS. Each of the probes 20, 30, and 40 has the thickness configured to be thinner than the widths of the phloem and the xylem of the plant. Although the thickness of each of the probes 20, 30, and 40 depends on the kind and the thickness of the stem of the plant as the measurement target, the thickness is, for example, from 50 to 300 μm. The thickness of 50 μm or more provides sufficient strength, and there is no fear of bend of the plant when the probe 20, 30, or 40 is inserted into and removed from, for example, the stem. Additionally, although depending on the kind of the plant, the thicknesses of the xylem and the phloem are around 100 to 400 μm, and therefore as long as the thickness is 300 μm or less, even when the probe 20, 30, or 40 is stuck into the xylem or the phloem, blocking the xylem or the phloem can be inhibited.

It is more preferred that each of the probes 20, 30, and 40 has a thickness of 50 to 100 μm. The thinner the probes 20, 30, and 40 are, the smaller the damage given to the plant can be. When the thickness of each of the probes 20, 30, and 40 is 100 μm or less, the flow-out of the water in the plant can be inhibited, and thus, the water content of the plant can be accurately measured.

The probes 20, 30, and 40 having such a shape is formed in, for example, the following procedure. Photolithography of a probe shape is performed on the semiconductor substrate SS and an unnecessary part is removed by dry etching, such as ICP-RIE, to form an original shape of the probe shape. Next, the semiconductor substrate SS is etched from the back surface such that the probes 20, 30, and 40 are cantilevered. This process uses dry etching, such as ICP-RIE. The semiconductor substrate SS is etched from the back surface and the etching is terminated at a phase where the probes 20, 30, and 40 are separated. Accordingly, the probes 20, 30, and 40 in the cantilever manner can be formed.

Water Content Probe

As illustrated in FIG. 1, a readout electrode pair 21 is disposed at the tip portion of the water content probe 20. The readout electrode pair 21 is made of a pair of electrodes 22, 22 disposed at a predetermined interval thereof. On the upper surface of the supporting portion 10, there are arranged two electrode pads 22e, 22e coupled to the two electrodes 22 via wirings. The water content probe 20 is provided with a water sensitive film 23.

Sticking the water content probe 20 into the plant causes the water sensitive film 23 to absorb the water in the plant. The amount of the water absorbed by the water sensitive film 23 is read out as impedance or an electrostatic capacity between the electrodes 22 and 22. Thus, the water content of the plant can be measured.

Figure 3:
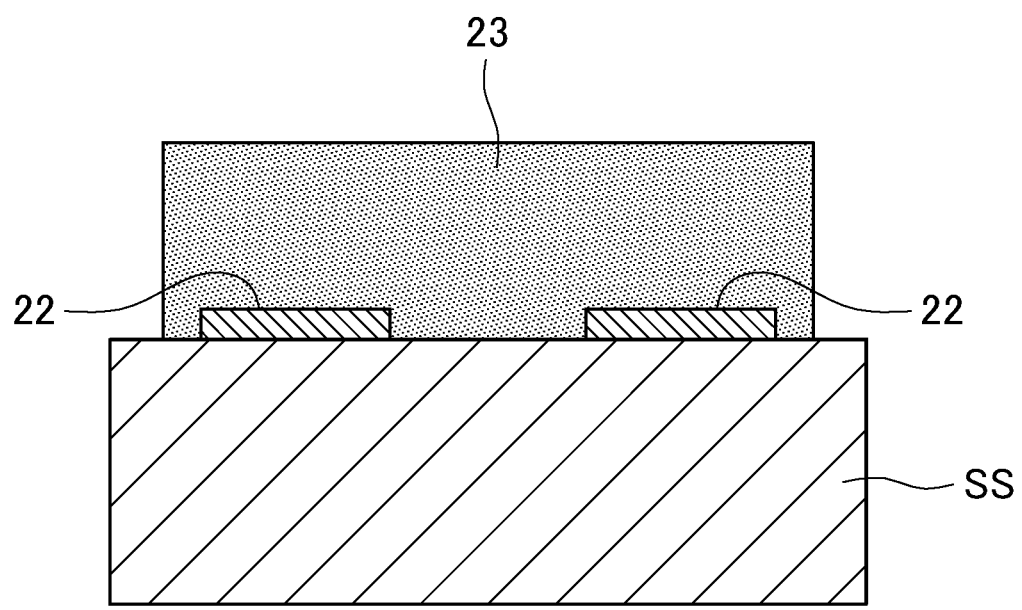
FIG. 3 is a cross-sectional view taken along the line and viewed in the arrow direction in FIG. 1.

As illustrated in FIG. 3, the pair of electrodes 22, 22 are formed on the surface of the semiconductor substrate SS that configures the water content probe 20. The electrode 22 is not specifically limited as long as it has a size that can be arranged at the tip portion of the water content probe 20. The electrode 22 is formed by, for example, depositing a metal thin film of Au, Al, or the like on the semiconductor substrate SS by, for example, sputtering method and evaporation method.

The water sensitive film 23 is formed on the pair of electrodes 22, 22 so as to be bridged across those. The water sensitive film 23 has a function of absorbing water, and is formed of a material having a relative dielectric constant lower than that of water. The "water sensitive film" herein means a film having a function of absorbing water and formed of a material having a relative dielectric constant lower than that of water. The relative dielectric constant of the water at a temperature of 20° C. is approximately 80, and therefore, the relative dielectric constant of the water sensitive film 23 is only necessary to be smaller than 80. However, since the larger the difference between the relative dielectric constant of the water sensitive film 23 and the relative dielectric constant of water is, the higher the measurement accuracy of the water content becomes, the relative dielectric constant of the water sensitive film 23 is preferably 1 to 3.

The material of the water sensitive film 23 is preferred to be insoluble in water and thermally and chemically stable. For the material of the water sensitive film 23, for example, lithium chloride, metal oxides, ceramics, and high-polymer materials are usable. However, the lithium chloride is toxic to plants, and therefore, it does not have high applicability to plants. Examples of the metal oxides and ceramics include aluminum oxide ($Al_2O_3$) and silicon dioxide ($SiO_2$). The metal oxides and the ceramics are insoluble in water. However, the metal oxides and the ceramics are hard materials and require a heat treatment at high temperature during the manufacturing process. In contrast to this, the high-polymer materials have high applicability to plants and is a soft material. Examples of the high-polymer materials include polyimide and polyvinyl alcohol. Among these, polyimide is preferred from the aspect of easy installation onto a semiconductor Si substrate. Since polyimide is hardly soluble to water, it is suitable for a long-term measurement of the water in the plant. Therefore, forming the water sensitive film 23 with polyimide makes the water sensitive film 23 difficult to dissolve in the water in the plant and allows a long-term measurement.

When the water sensitive film 23 is formed of the high-polymer material, the surface of the water sensitive film 23 may be hydrophilically treated. In such a case, the water in the plant is easily absorbed by the water sensitive film 23 and a response speed of the water content measurement increases. For example, when the water sensitive film 23 is formed of polyimide, it is only necessary to perform an oxygen plasma treatment on the surface of the water sensitive film 23. The oxygen plasma treatment on the surface of polyimide introduces a carbonyl group and the surface of polyimide is hydrophilized. There also is an effect of increasing the surface area of polyimide. Since the water sensitive film 23 is hydrophilized and the surface area is increased, the water in the plant is easily absorbed by the water sensitive film 23 and the response speed of the water content measurement increases.

Electrical Conductivity Probe

As illustrated in FIG. 1, an electrical conductivity electrode pair 31 is disposed at the tip portion of the electrical conductivity probe 30. The electrical conductivity electrode pair 31 is made of a pair of electrodes 32, 32 disposed at a predetermined interval thereof. The electrical conductivity electrode pair 31 is for measuring electrical conductivity of the water (such as vascular sap) present between the electrodes 32 and 32. The electrode 32 is not specifically limited as long as it has a size that can be arranged at the tip portion of the electrical conductivity probe 30. The electrode 32 is formed by, for example, depositing a metal thin film of Au, Al, or the like on the semiconductor substrate SS by, for example, sputtering method and evaporation method.

On the upper surface of the supporting portion 10, there are arranged two electrode pads 32e, 32e coupled to the two electrodes 32, 32 via wirings. The electrical conductivity is measurable by AC two-electrode method. That is, an AC source and an ammeter are coupled in series between the pair of electrode pads 32e and 32e corresponding to the pair of electrodes 32 and 32. The AC source supplies a current between the electrodes 32 and 32, and the ammeter measures the current flowing between the electrodes 32 and 32. Based on the Ohm's law, an electrical resistance between the electrodes 32 and 32 is calculated from the current measured with the ammeter, and the electrical conductivity is determined from the electrical resistance.

To measure the electrical conductivity of the water in the plant, it is preferred that the measurement range of electrical conductivity is at least 0 to 10 mS/cm. The measurement range of electrical conductivity by AC two-electrode method depends on a cell constant K of the electrode pair. Here, the cell constant K is determined by dividing an inter-electrode distance L by an electrode surface area S. That is, the measurement range of electrical conductivity depends on the shape of the electrode 32. The shape of the electrode 32 can be selected from various kinds of shapes including three-dimensional electrodes, comb electrodes, plane electrodes, and the like.

Temperature Probe

A temperature sensor 41 is disposed at the tip portion of the temperature probe 40. The temperature sensor 41 is not specifically limited as long as it has a function of sensing temperature, and has a size that can be arranged at the tip portion of the temperature probe 40. For the temperature sensor 41, a resistance temperature detector, a pn junction diode, a thermocouple, or the like can be employed. Since the plant water content sensor 1 is assumed to be used outdoors, the resistance temperature detector is preferably used as the temperature sensor 41 as it is not light-dependent. On the upper surface of the supporting portion 10, there are arranged two electrode pads 41e, 41e coupled to the temperature sensor 41 via wirings.

The resistance temperature detector is formed by, for example, depositing a thin film of a metal suitable as a resistance temperature detector, such as Au, on the semiconductor substrate SS by, for example, sputtering method and evaporation method. The resistance temperature detector increases an electrical resistance together with the increase of temperature. A constant current source is coupled between the two electrode pads 41e and 41e. The constant current source supplies a constant current to the resistance temperature detector, and a voltmeter measures a voltage. From the voltage measured by the voltmeter, a temperature can be calculated.

Note that, the water content probe 20, the electrical conductivity probe 30, and the temperature probe 40 may be each configured as a different probe or a part or all of those may be configured as a single probe. That is, one probe may include all of the readout electrode pair 21, the water sensitive film 23, the electrical conductivity electrode pair 31, and the temperature sensor 41.

(Manufacturing Method)

Next, an exemplary method for manufacturing the plant water content sensor 1 will be described.

First, a surface of a silicon substrate is wet-oxidized to form an oxide film. Next, as an adhesive layer, Cr is sputtered on the oxide film, Au is sputtered on the adhesive layer, and thus, various kinds of electrodes, a resistance temperature detector, and wirings are formed. Next, a resist is applied to form a wiring protection film. Next, polyimide is applied to form the water sensitive film 23. Finally, an unnecessary part of the silicon substrate is removed by dry etching to form the probes 20, 30, and 40.

Note that, the plant water content sensor 1 may be formed by a method other than the MEMS technique and its material is not limited to the silicon substrate as long as the plant water content sensor 1 can be formed to have the above-described dimensions and functions.

(Plant Water Content Measuring Method)

Next, the measuring method of the water content by the plant water content sensor 1 will be described.

Mounting

Figure 4:
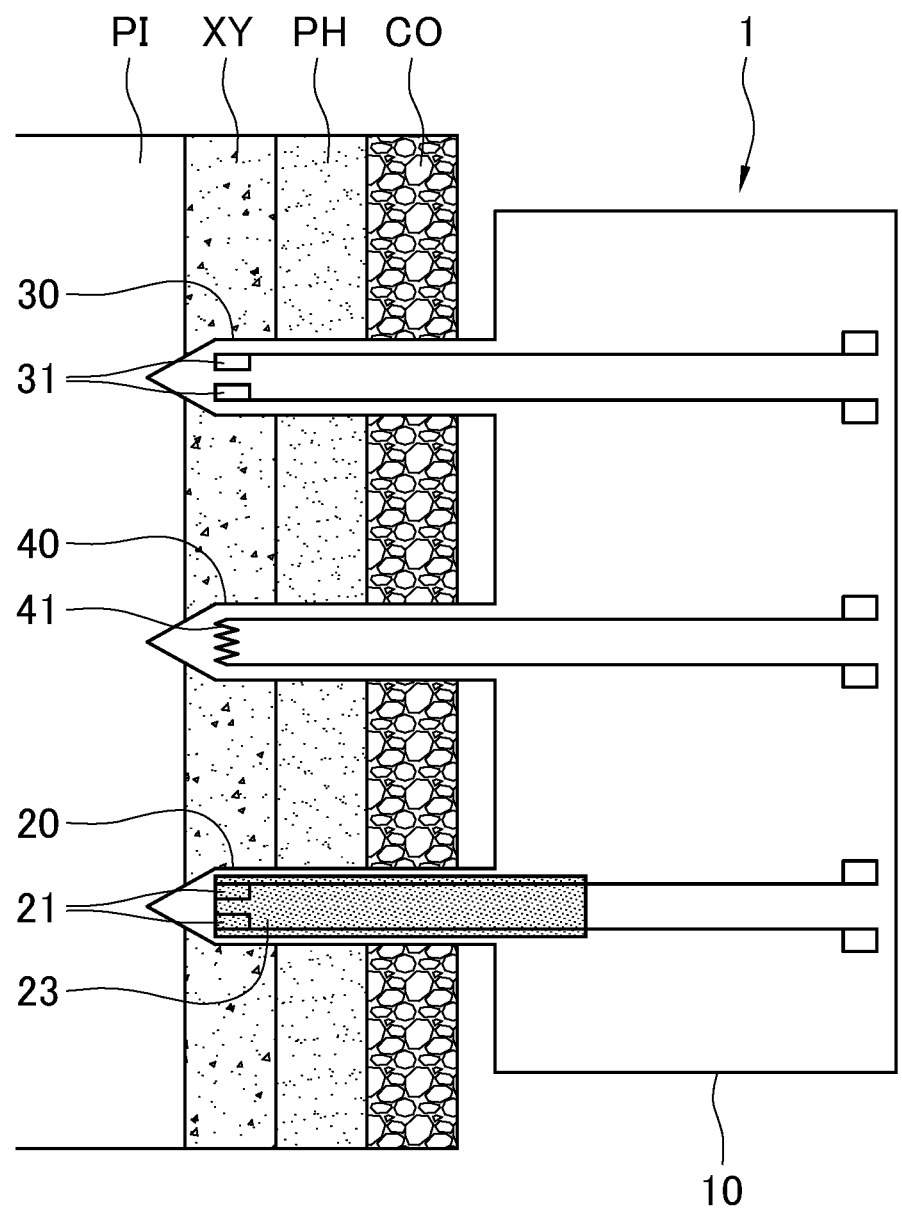
FIG. 4 is a use state explanatory view of the plant water content sensor according to the first embodiment.

First, the plant water content sensor 1 is mounted to a distal end of a new branch, a pedicel, and the like of the plant as the measurement targets. Specifically, as illustrated in FIG. 4, all of the probes 20, 30, and 40 of the plant water content sensor 1 are stuck and mounted in the plant. At this time, the probes 20, 30, and 40 are disposed along a xylem XY and a phloem PH of the plant.

When the probes 20, 30, and 40 are stuck into the plant, the tip portions of the probes 20, 30, and 40 pass through a cortex CO of the plant to reach the phloem PH. Furthermore, when the probes 20, 30, and 40 are stuck deeply, the tip portions of the probes 20, 30, and 40 reach the xylem XY and then reach a pith PI. The electrical conductivity of the water in the plant largely depends on the water suctioned through a soil, that is, xylem sap. Therefore, the electrical conductivity probe 30 and the temperature probe 40 are preferably disposed in the xylem XY.

The water sensitive film 23 is only necessary to be formed in a region that covers at least the readout electrode pair 21. However, the water sensitive film 23 is preferably disposed from the location of the readout electrode pair 21 to the base end portion of the water content probe 20. The water sensitive film 23 is further preferably disposed so as to cover from the base end portion of the water content probe 20 additionally to a partial region of the upper surface of the supporting portion 10. Thus disposed, the water sensitive film 23 is partially disposed outside of the plant.

The water sensitive film 23 absorbs water corresponding to a water amount in the plant. To capture decrease of the water in the plant, it is necessary to dehydrate the water that has been absorbed by the water sensitive film 23. If the water sensitive film 23 is partially disposed outside of the plant, the dehydration is accelerated from this portion contacting external air. Since the dehydration from the water sensitive film 23 is smoothly performed, the response speed when the water content reduces increases.

Water Content Measurement (Method by Impedance)

When the water content probe 20 is stuck into the plant, the water in the plant is absorbed by the water sensitive film 23. The water amount absorbed by the water sensitive film 23 changes corresponding to the water amount in the plant. The impedance between the electrodes 22 and 22 constituting the readout electrode pair 21 changes corresponding to the water amount absorbed by the water sensitive film 23.

A relationship between impedance Z [kΩ] between the electrodes 22 and 22 and a water content WC [%] of the plant is expressed by Formula (1).

$$Z = Z_0 \times 10^{-B \cdot WC} \quad (1)$$

Here, $Z_0$ indicates an impedance [kΩ] when no water is absorbed by the water sensitive film 23 and B indicates a coefficient representing sensitivity of the sensor.

$Z_0$ and B are determined by a test in advance. When the water content of the plant is measured, the impedance Z between the electrodes 22 and 22 is measured. The water content WC of the plant is determined from the impedance measurement value Z based on Formula (1).

Water Content Measurement (Method by Electrostatic Capacity)

There is a relationship that when the water amount absorbed by the water sensitive film 23 increases, the electrostatic capacity between the electrodes 22 and 22 constituting the readout electrode pair 21 increases. In particular, appropriately selecting the material of the water sensitive film 23, the water amount absorbed by the water sensitive film 23 and the electrostatic capacity between the electrodes 22 and 22 make a linear relationship. This relationship is determined by a test in advance. When the water content of the plant is measured, an electrostatic capacity C between the electrodes 22 and 22 is measured. The water content WC of the plant is determined from the electrostatic capacity measurement value C based on the relationship between the electrostatic capacity and the water content.

As described above, by sticking the water content probe 20 into the plant and reading out the impedance or the electrostatic capacity from the readout electrode pair 21, the water content of the plant can be measured.

Electrical Conductivity Compensation

The water content measurement value obtained by the water content probe 20 depends on the electrical conductivity of the water in the plant. Therefore, the water content measurement value is preferably compensated by electrical conductivity. The electrical conductivity of the water (mainly the xylem sap) in the plant can be measured by the electrical conductivity electrode pair 31 of the electrical conductivity probe 30. Based on the electrical conductivity measured by the electrical conductivity probe 30, the water content measurement value is compensated. Thus, the water content of the plant can be accurately measured.

For example, when the water content is determined from the impedance between the electrodes 22 and 22, the sensor sensitivity coefficient B in Formula (1) is determined in advance using solutions with various electrical conductivity. When the water content of the plant is measured, simultaneously with this, the electrical conductivity of the water in the plant is measured. The water content WC of the plant is determined from the impedance Z based on Formula (1) in which the sensor sensitivity coefficient B corresponding to the measured electrical conductivity is applied. Thus, determining the sensor sensitivity coefficient B from the electrical conductivity measurement value allows compensating the water content measurement value.

The inventors of the present application have obtained the knowledge that the sensor sensitivity coefficient B linearly depends on electrical conductivity σ. Accordingly, the sensor sensitivity coefficient B in Formula (1) is determined in advance by measuring the impedance Z by the water content probe 20 using solutions with various electrical conductivity σ, and then, the relationship between the electrical conductivity σ and the sensor sensitivity coefficient B is fitted with the linear function. That is, coefficients a and b in the relational expression between the electrical conductivity σ and the sensor sensitivity coefficient B expressed by Formula (2) below are preliminarily determined.

$$B = a\sigma + b \quad (2)$$

When the water content of the plant is measured, the impedance Z is measured by the water content probe 20 and the electrical conductivity σ is measured with the electrical conductivity probe 30. The sensor sensitivity coefficient B is determined from the electrical conductivity measurement value σ based on Formula (2). Based on Formula (1) in which the determined sensor sensitivity coefficient B is applied, the water content WC of the plant is determined from the impedance Z.

Similarly, when the water content is determined from the electrostatic capacity between the electrodes 22 and 22, the relationship between the water amount absorbed by the water sensitive film 23 and the electrostatic capacity between the electrodes 22 and 22 is determined in advance using solutions with various electrical conductivity. When the water content of the plant is measured, simultaneously with this, the electrical conductivity of the water of the plant is measured. Based on the relationship between the water amount and the electrostatic capacity corresponding to the measured electrical conductivity, the water content WC of the plant is determined from the electrostatic capacity C.

Note that, the electrical conductivity of the water in the plant itself is biological information effective for the plant production. Disposing the tip portion of the electrical conductivity probe 30 in the xylem XY allows measuring the electrical conductivity of the xylem sap. Fertilizer spread on soil is decomposed into salt content, such as nitrate nitrogen, by microorganism. Additionally, the salinity and the electrical conductivity are positively correlated. Therefore, measuring the electrical conductivity of the xylem sap allows quantifying nutritional substances taken in by the plant.

Temperature Compensation

The electrical conductivity measurement value obtained by the electrical conductivity probe 30 depends on the temperature. Generally, the electrical conductivity measurement value changes 1 to 3% for every 1° C. Therefore, performing the temperature compensation on the electrical conductivity measurement value is preferred. The temperature of the water (mainly the xylem sap) in the plant can be measured by the temperature sensor 41 of the temperature probe 40. The compensation is performed on the electrical conductivity measurement value based on the temperature measured by the temperature probe 40. Thus, the electrical conductivity of the water in the plant can be accurately determined. The compensation is further performed on the water content measurement using the electrical conductivity after the temperature compensation, and thus, the water content can be accurately determined.

The temperature compensation of the electrical conductivity measurement value is performed, for example, in the following procedure. That is, the electrical conductivity measurement value is converted to electrical conductivity $\sigma_{25}$ [S/m] at a reference temperature of 25° C. based on Formula (3). Here, $\alpha$ is a temperature coefficient, T is a temperature [° C.] of the measurement target liquid, and $\sigma$ is an electrical conductivity measurement value [S/m].

$$\sigma_{25} = \alpha|25-T|\sigma \quad (3)$$

The temperature coefficient $\alpha$ is determined from Formula (4). Here, $T_1$ indicates a temperature [° C.] other than 25° C. or $T_2$, $T_2$ indicates a temperature [° C.] other than 25° C. or $T_1$, $\sigma_1$ indicates an electrical conductivity measurement value [S/m] at $T_1$, and $\sigma_2$ indicates an electrical conductivity measurement value [S/m] at $T_2$.

$$\alpha = \frac{(\sigma_1 - \sigma_2)}{[\sigma_2(T_1 - 25) - \sigma_1(T_2 - 25)]} \quad (4)$$

When the water sensitive film 23 is formed of polyimide, the water content measurement value measured with the water content probe 20 does not depend on the temperature. However, when the water sensitive film 23 is formed of another material, the water content measurement value may depend on the temperature. In such a case, the temperature compensation may be performed on the water content measurement value. That is, the compensation is directly performed on the water content measurement value based on the temperature measured by the temperature probe 40. Thus, the water content can be accurately measured.

The use of the plant water content sensor 1 allows measuring the water content of the plant, in particular, the water content in the fine point of the plant, such as the distal end of the new branch and the pedicel of the plant in a non-destructive manner. For example, it has been known that tomatoes have an increased sugar content when they are grown under a water stress. The use of the plant water content sensor 1 allows obtaining an indicator for avoiding an extreme water deficit and fruit cracking caused by a rapid flow of vascular sap to a fruit, thereby allowing to provide an appropriate water stress. Thus, the plant water content sensor 1 can be utilized for high-quality and stable production of crops and tree-fruits.

Second Embodiment

Next, a plant water content sensor 2 according to the second embodiment of the present invention will be described.

Figure 5:
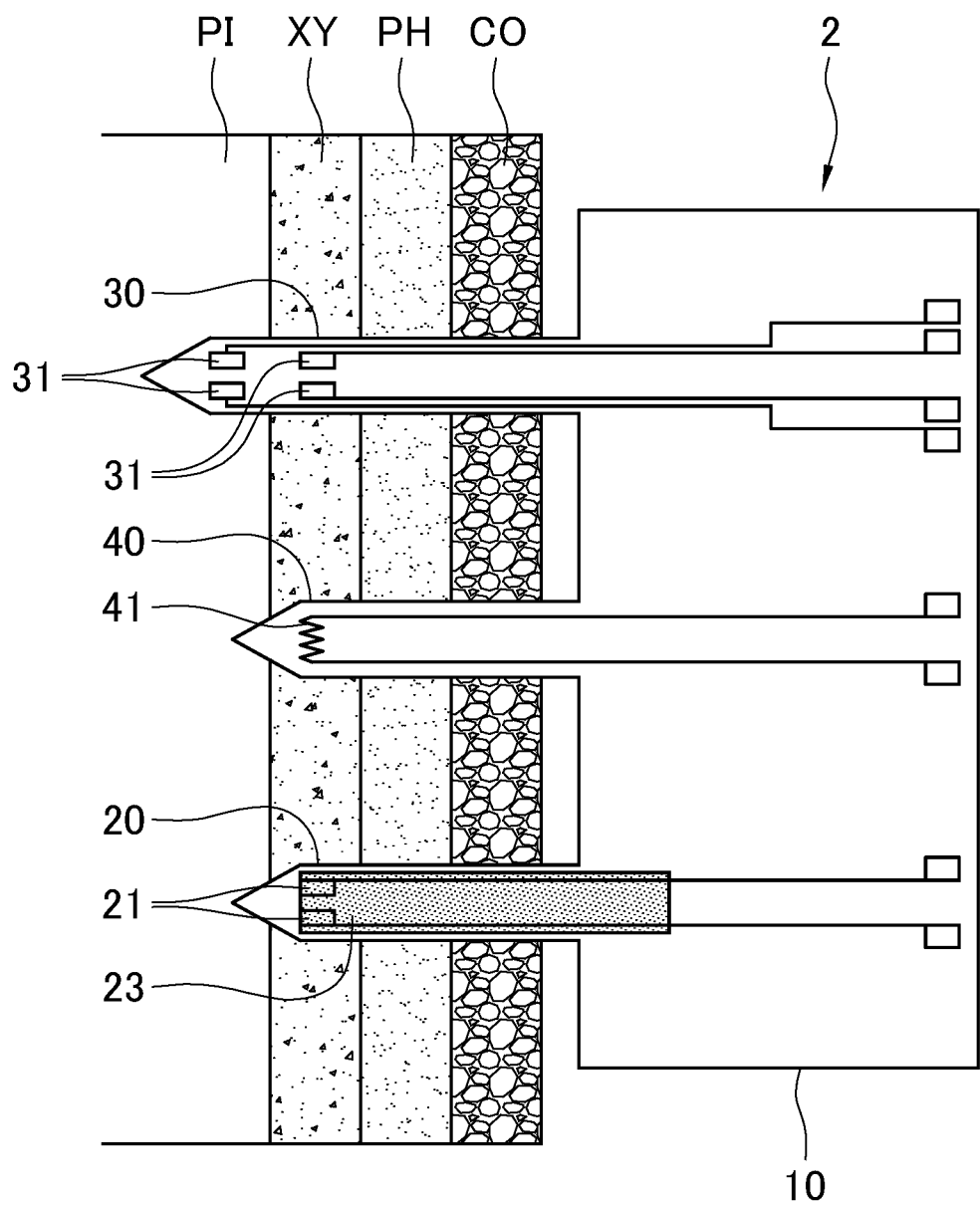
FIG. 5 is a plan view of a plant water content sensor according to a second embodiment.

As illustrated in FIG. 5, the plant water content sensor 2 of this embodiment has the electrical conductivity probe 30 formed to be longer than the other probes 20 and 40. The electrical conductivity probe 30 is provided with a plurality of the electrical conductivity electrode pairs 31 arranged in the axial direction.

In the example illustrated in FIG. 5, two electrical conductivity electrode pairs 31 are disposed in the electrical conductivity probe 30. The electrical conductivity electrode pair 31 on a base end portion side is disposed at approximately the same position as the position of the temperature sensor 41 of the temperature probe 40 in the sticking direction into the plant. The electrical conductivity electrode pair 31 on a tip side is disposed at a position deeper than the position of the temperature sensor 41 when it is stuck into the plant.

Since the xylem sap contains salt content, such as nitrate nitrogen, the xylem sap has a property of high electrical conductivity compared with the water contained in other portions (the cortex CO, the phloem PH, the pith PI, and the like). When the electrical conductivity probe 30 is stuck into the plant, the electrical conductivity distribution in the plant is known, and therefore, the position of the xylem XY can be accurately determined. If the electrical conductivity electrode pair 31 on the base end portion side is disposed in the xylem XY, the probes 20, 30, and 40 can have appropriate sticking amounts.

Third Embodiment

Next, a plant water content sensor 3 according to the third embodiment of the present invention will be described. The plant water content sensor 3 has a function of measuring a vascular sap flow rate in addition to the water content of the plant.

(Plant Water Content Sensor)

Figure 6:
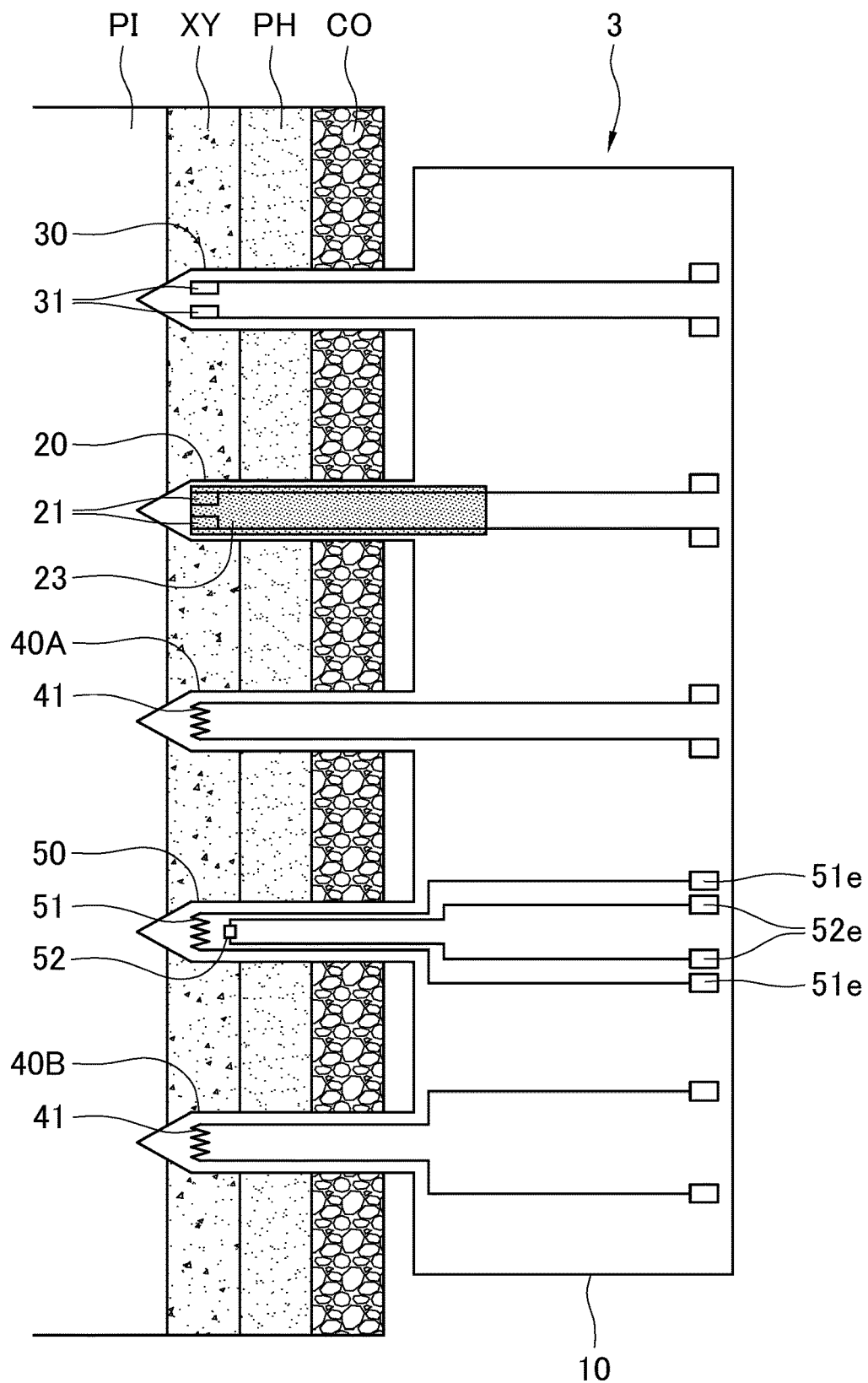
FIG. 6 is a plan view of a plant water content sensor according to a third embodiment.

As illustrated in FIG. 6, the plant water content sensor 3 of this embodiment is configured by substituting two temperature probes, which include a first temperature probe 40A and a second temperature probe 40B, for the temperature probe 40 and adding a heater-equipped temperature probe 50 in the plant water content sensor 1 of the first embodiment. The configurations other than that are similar to those of the first embodiment, and therefore the same reference signs are given to the same members and the description thereof will be omitted.

The first and second temperature probes 40A and 40B and the heater-equipped temperature probe 50 are used in sets for measuring the vascular sap flow rate. The temperature measured with the first temperature probe 40A is used also for the temperature compensation of the water content measurement value and the electrical conductivity measurement value.

The first and second temperature probes 40A and 40B and the heater-equipped temperature probe 50 are arranged in parallel in the same plane together with the other probes 20 and 30, and the base ends of the first and second temperature probes 40A and 40B and the heater-equipped temperature probe 50 are supported by the supporting portion 10. The first and second temperature probes 40A and 40B are disposed at positions across the heater-equipped temperature probe 50. The first and second temperature probes 40A and 40B and the heater-equipped temperature probe 50 have shapes and dimensions similar to those of the other probes 20 and 30.

Temperature Probe

The first and second temperature probes 40A and 40B each have configurations similar to the temperature probe 40 of the first embodiment. That is, each of the first and second temperature probes 40A and 40B includes the temperature sensor 41 on the tip portion. The temperature sensor 41 can measure the temperature of the vascular sap.

Heater-Equipped Temperature Probe

A temperature sensor 51 is disposed on the tip portion of the heater-equipped temperature probe 50. As the temperature sensor 51, the temperature sensor similar to the temperature sensor 41 of the temperature probe 40 can be used. On the top surface of the supporting portion 10, two electrode pads 51e coupled to the temperature sensor 51 via wiring are disposed. The temperature can be measured by the temperature sensor 51 by the method similar to that of the temperature sensor 41 of the temperature probe 40.

The heater-equipped temperature probe 50 includes a heater 52. The heater 52 only needs to supply heat to the heater-equipped temperature probe 50, and the position is not limited to the tip portion. As long as the heater 52 can be disposed on the heater-equipped temperature probe 50, the size of the heater 52 is not specifically limited. For example, a pn junction diode formed using an oxidation diffusion furnace can be employed as the heater 52. The heater 52 may be formed by forming a thin film of platinum (Pt), nichrome (NiCr), or an indium tin oxidation material (ITO) by, for example, sputtering method and evaporation method and processing the thin film in a predetermined shape.

On the top surface of the supporting portion 10, two electrode pads 52e coupled to the heater 52 via wiring are disposed. A DC constant voltage source is coupled between the two electrode pads 52e and 52e. A constant voltage is supplied to the heater 52 as the pn junction diode by the DC constant voltage source in the forward direction. Flowing a current through the heater 52 allows generating heat.

(Measuring Method)

Next, the measuring method of the vascular sap flow rate by the plant water content sensor 3 will be described.

As illustrated in FIG. 6, all of the probes 20, 30, 40A, 40B, and 50 of the plant water content sensor 3 are stuck and mounted in the plant. To measure the flow rate of the phloem sap, the tip portions of the first and second temperature probes 40A and 40B and the heater-equipped temperature probe 50 are disposed in the phloem PH. To measure the flow rate of the xylem sap, the tip portions of the first and second temperature probes 40A and 40B and the heater-equipped temperature probe 50 are disposed in the xylem XY. Hereinafter, the case of measuring the flow rate of the xylem sap will be described.

First, the heater 52 disposed on the heater-equipped temperature probe 50 is operated. Upon operation of the heater 52, heat energy supplied from the heater 52 is supplied to the heater-equipped temperature probe 50. The heat energy supplied to the heater-equipped temperature probe 50 is emitted from the surface of the heater-equipped temperature probe 50 to the xylem sap flowing the inside of the xylem XY.

The temperature sensors 41, 41, and 51 measure the temperatures of the first and second temperature probes 40A and 40B and the heater-equipped temperature probe 50 at the time. Then, through comparison of the temperatures of the first temperature probe 40A and the second temperature probe 40B, the direction of the xylem flow is identified.

Assume that the direction of the xylem flow is the upward direction in FIG. 6. The first and second temperature probes 40A and 40B are disposed at positions across the heater-equipped temperature probe 50. The xylem sap has a temperature increased by the heater-equipped temperature probe 50. Therefore, the temperature measured with the first temperature probe 40A disposed in the downstream of the heater-equipped temperature probe 50 is higher than the temperature measured with the second temperature probe 40B disposed at the upstream. By using this, the direction of the xylem flow can be identified as the direction heading from the second temperature probe 40B having a lower temperature to the first temperature probe 40A having a higher temperature.

Next, from the temperatures measured by the first and second temperature probes 40A and 40B and the heater-equipped temperature probe 50, the flow rate of the xylem sap is measured based on Granier method. Here, calculation is performed based on the temperature difference between the second temperature probe 40B whose temperature is low among the first and second temperature probes 40A and 40B and the heater-equipped temperature probe 50. The second temperature probe 40B having the lower temperature is disposed on the upstream of the xylem flow with respect to the heater-equipped temperature probe 50.

For example, when the flow rate of the xylem sap is large (a flow velocity is fast), the xylem sap at the proximity of the heater-equipped temperature probe 50 is always replaced by the new xylem sap. Therefore, making the heat energy supplied to the heater-equipped temperature probe 50 constant lowers the temperature of the heater-equipped temperature probe 50. On the other hand, when the flow rate of the xylem sap is small (the flow velocity is slow), the xylem sap at the proximity of the heater-equipped temperature probe 50 is accumulated. Therefore, making the heat energy supplied to the heater-equipped temperature probe 50 constant rises the temperature of the heater-equipped temperature probe 50.

Accordingly, the flow velocity of the xylem sap can be obtained from a temperature difference $\Delta T$ between the second temperature probe 40B and the heater-equipped temperature probe 50. Specifically, as shown by Formula (5), the temperature difference $\Delta T$ becomes a function of a flow velocity u. Based on the function, the flow velocity u can be calculated from the temperature difference $\Delta T$.

$$u = \frac{1}{\alpha} \left\{ \frac{\Delta T(0) - \Delta T(u)}{\Delta T(u)} \right\}^{\frac{1}{\beta}} \quad (5)$$

Here, u indicates an average flow velocity [m/s], $\Delta T(u)$ indicates a temperature difference [° C.] between the temperature probe 40B and the heater-equipped temperature probe 50 when the average flow velocity is u, $\Delta T(0)$ indicates the maximum temperature [° C.] of $\Delta T$, and $\alpha$ and $\beta$ indicate coefficients obtained from the observation data.

Additionally, based on Formula (6), a flow rate F can be calculated from the flow velocity u.

$$F = u \times S \quad (6)$$

Here, F indicates the flow rate [m³/s], and S indicates a cross-sectional area [m²] of the xylem.

Note that when the tip portions of the first and second temperature probes 40A and 40B and the heater-equipped temperature probe 50 are disposed in the phloem PH of the plant, the flow velocity and the flow rate of the phloem sap can be obtained together with the direction of the phloem flow. Additionally, the plant water content sensor 3 can measure the flow rate of vascular sap also by heat pulse method. The temperature probe 40 disposed in the plant water content sensor 3 may be one. Such a configuration can also measure the flow rate of the vascular sap.

Thus, the plant water content sensor 3 can measure the vascular sap flow rate in addition to the water content of the plant. Therefore, the water dynamics of the plant can be multidirectionally grasped and the state of the plant can be seen in more detail.

EXAMPLES (Tip Angle)

First, a test was carried out on the tip angles of the probes.

Figure 7:
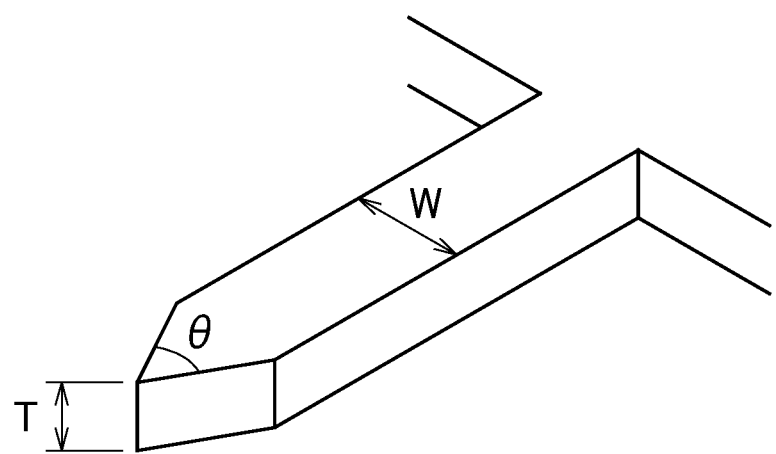
FIG. 7 is an explanatory view of a tip angle θ, a width W, and a thickness T of a probe.

As illustrated in FIG. 7, flat plate-shaped probes were fabricated using silicon substrates. A tip angle θ, a width W, and a thickness T of the probe are defined as illustrated in FIG. 7. Four probes with the tip angles θ of 136°, 120°, 90°, and 60°, were fabricated. Every probe has the width W of 480 μm and the thickness T of 300 μm.

A sample (PDMS: Polydimethylsiloxane, DuPont Toray Specialty Materials K.K.) having a Young's modulus (2.2 MPa) approximately the same as that of a plant was prepared. Resistive powers when the respective probes were inserted into the sample were measure using a force sensor (DynPick WEF-6A, WACOH-TECH Inc.). As the result, puncture resistances when the probes were stuck into the sample were as shown in Table 1. It is seen that the smaller the tip angle θ of the probe is, the smaller the puncture resistance becomes from Table 1.

TABLE 1

| Tip angle θ [degree] | Puncture resistance [N] |
|---|---|
| 136 | 1.72 |
| 120 | 1.51 |
| 90 | 1.21 |
| 60 | 0.74 |

Next, states where the respective probes were stuck into a stem of a cucumber were observed with a microscope. Deformation of the stem and water flow-out from the stem were confirmed with the probes having the tip angles θ of 136°, 120°, and 90°. On the other hand, no deformation of the stem or water flow-out from the stem was confirmed with the probe having the tip angle θ of 60°. In view of this, it has been confirmed that the probe with the tip angle θ of 60° or less can inhibit the flow-out of the water in the plant when the probe is stuck into the plant.

(Fabrication of Sensor)

Next, a plant water content sensor having the configuration illustrated in FIG. 1 was fabricated using a silicon substrate.

Each probe has a tip angle θ of 60°, a width W of 480 μm, a thickness T of 300 μm, a length (the length from the base end to the tip in the axial direction) of 1,200 μm. Various electrodes, a resistance temperature detector, and wirings were formed of Au. A water sensitive film was formed of polyimide.

(Response Characteristic)

Next, the response characteristic of the fabricated plant water content sensor was evaluated.

Absorbent cottons were saturated with 0.05 mol/L of a KCl solution, and two kinds of absorbent cottons adjusted to have 90% or 60% of water content were prepared using an electronic scale (AUW220D, Shimadzu Corporation, the same applies below).

The operation in which each absorbent cotton was brought into contact with the water sensitive film of the water content probe and was removed after a certain period of time was performed. The graph in FIG. 8 illustrates temporal variations of the impedance measured with the water content probe during this period.

Figure 8:
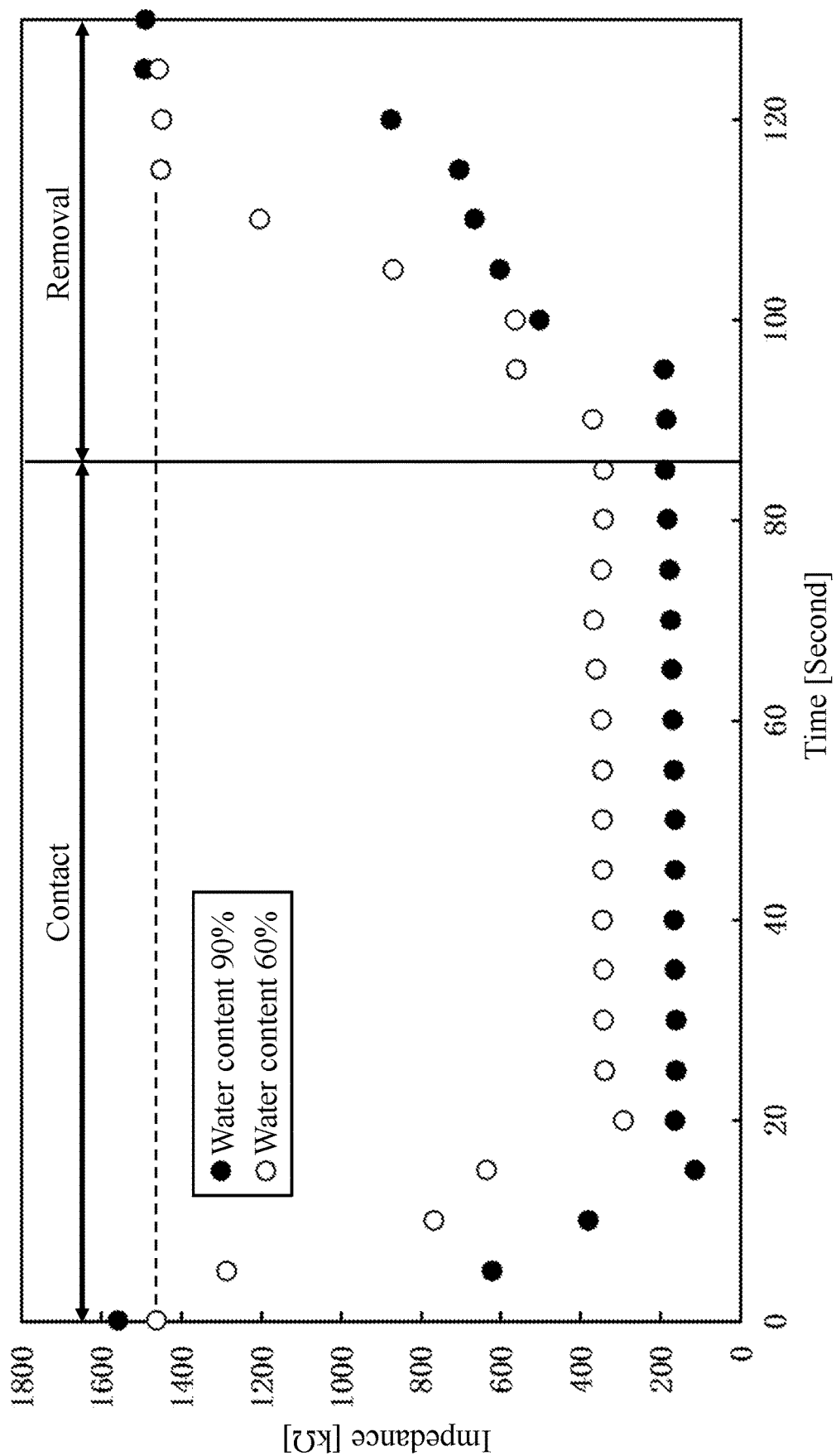
FIG. 8 is a graph illustrating test results of response characteristics.

The graph in FIG. 8 shows that the measurement values of the impedance stabilized in approximately 20 seconds after the absorbent cottons were brought into contact with the water sensitive film. The measurement values of the impedance stabilize in approximately 30 seconds after the absorbent cottons were removed from the water sensitive film. In view of this, it is seen that the response speed of the water content probe is approximately 30 seconds. It is considered that the response speed is sufficiently fast compared with the time scale (several hours) of plant irrigation.

The measurement values of the impedance were approximately constant until the absorbent cottons were removed after the absorbent cottons were brought into contact with the water sensitive film and the measurement values of the impedance stabilized. This has confirmed that the water content measurement has stability. Furthermore, the impedance after the absorbent cottons were removed from the water sensitive film returned to the values before the absorbent cottons were brought into contact with the water sensitive film. This has confirmed that the reproducibility of the water content is sufficient. Thus, the water content probe has been confirmed to have a satisfactory response characteristic.

(Calibration)

Next, the calibration of the water content measurement was performed.

Figure 9:
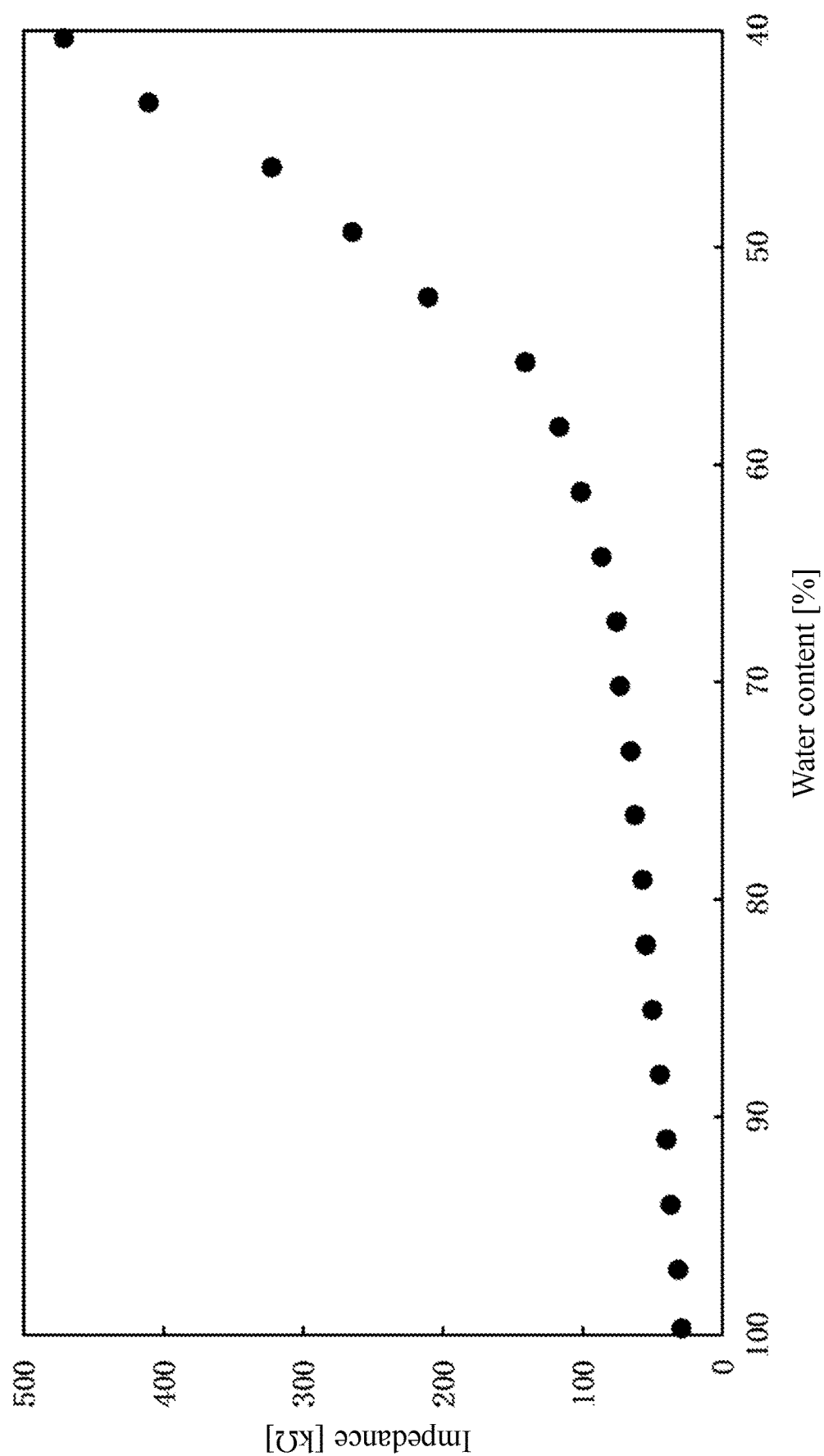
FIG. 9 is a graph illustrating a relationship between a water content and impedance.

The plant water content sensor was mounted to a cut branch of a tomato (*Solanum lycopersicum* L., the same applies below) put on the electronic scale. The temporal variation in the water content of the cut branch in association with drying was measured with the electronic scale. The temporal variation in the impedance was also measured with the water content probe. The results are shown in FIG. 9. The electrical conductivity of the water in the cut branch measured with the electrical conductivity probe was 4.8 mS/cm. The temperature of the water in the cut branch measured with the temperature probe was 26° C.

As can be seen from the graph in FIG. 9, the impedance exponentially changes in association with the change of the water content. Fitting Formula (1) to the measurement points obtained $Z_0$ of $1.27 \times 10^3$ and B of 0.0165. The water content of general plants is 98 to 60%. The graph in FIG. 9 has confirmed that the plant water content sensor can measure the water content in the range of 100 to 40%, which covers the range of the water content of general plants.

(Measurement in Growing Environment)

Next, the water content was measured using a tomato in a growing environment.

Figure 10:
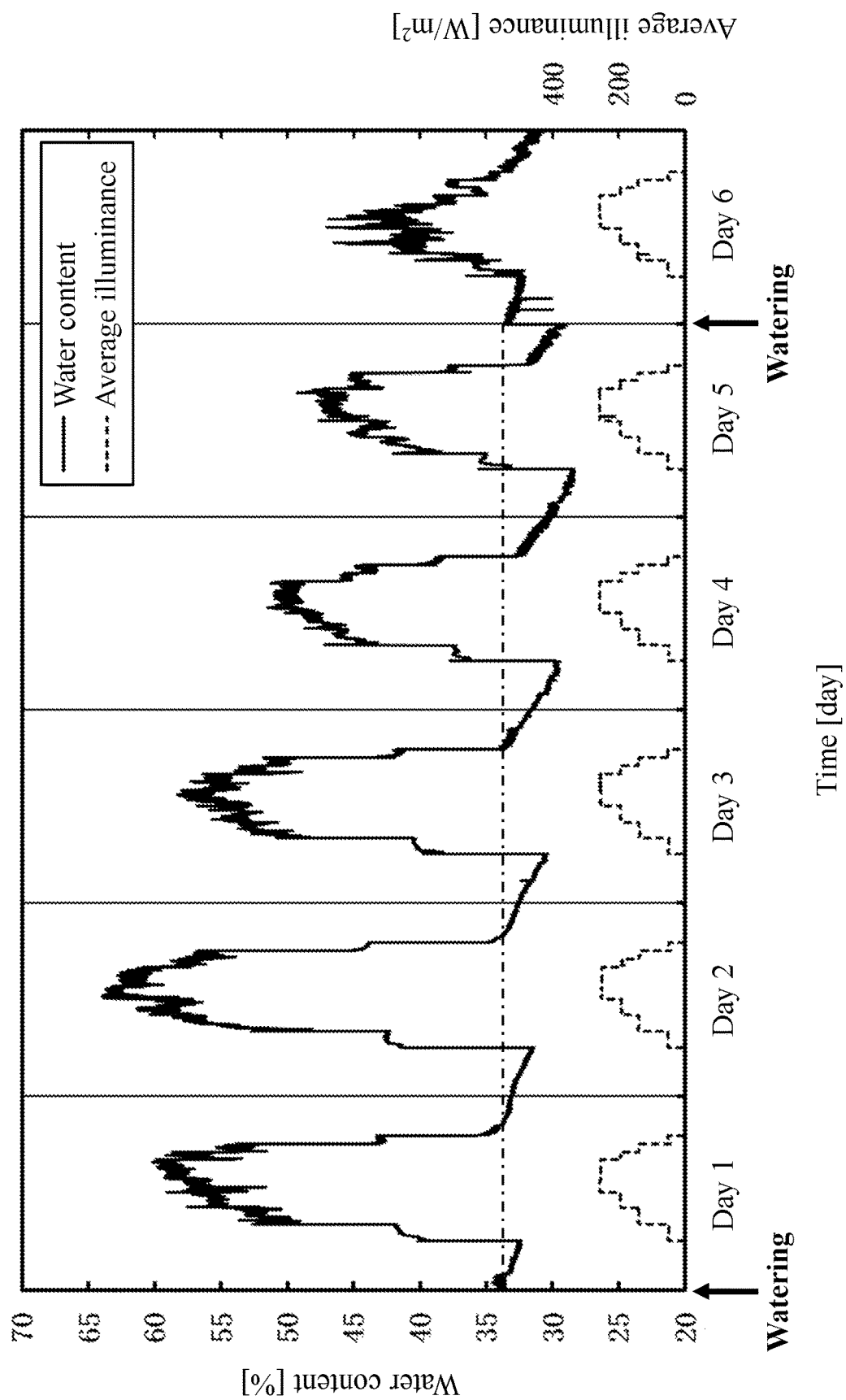
FIG. 10 is a graph illustrating a temporal variation of a water content (impedance) of a tomato in a growing environment.

The plant water content sensor was mounted to a stem of the tomato that had been sown in culture soil (420036, DCM Holdings Co., Ltd.) and grown in a plant growth chamber (NC-HC, Nippon Medical & Chemical Instruments Co., Ltd.). Here, the mounting position of the plant water content sensor was a position at 150 mm from the soil surface. The environment in the plant growth chamber was set to have a temperature of 25° C., humidity of 70%, and a carbon dioxide concentration of 500 ppm. The light amount in the plant growth chamber was varied according to the actual time. The water-stressed cultivation that provides 500 mL of water only twice, at the beginning of the measurement and after five days, was performed. FIG. 10 shows the temporal variation of the water content measured with the plant water content sensor during this period.

FIG. 10 shows that the water content varies depending on day or night and decreases day by day. The water content after watering at the beginning of the measurement and the water content after watering after five days are approximately the same. This change in the water content is considered to be reproduction of the change in a water content of a plant that changes due to rainfall. In view of this, it has been confirmed that the plant water content sensor can measure the water content of the plant on a real-time basis in a non-destructive manner.

(Electrical Conductivity Compensation)

Next, the relationship between the sensor sensitivity coefficient B in Formula (1) and the electrical conductivity σ was confirmed.

Three kinds of KCl solutions with the electrical conductivity σ adjusted to 1.9, 5.4, and 9.7 mS/cm were prepared. An absorbent cotton was saturated with the KCl solution and the water content was measured using the electronic scale. The absorbent cotton was brought into contact with the water sensitive film of the water content probe and the impedance was measured. This operation was performed for each of the three kinds of KCl solutions while varying the water contents in the absorbent cottons. The relationships between the water contents and the impedance obtained as the result are shown in FIG. 11.

Figure 11:
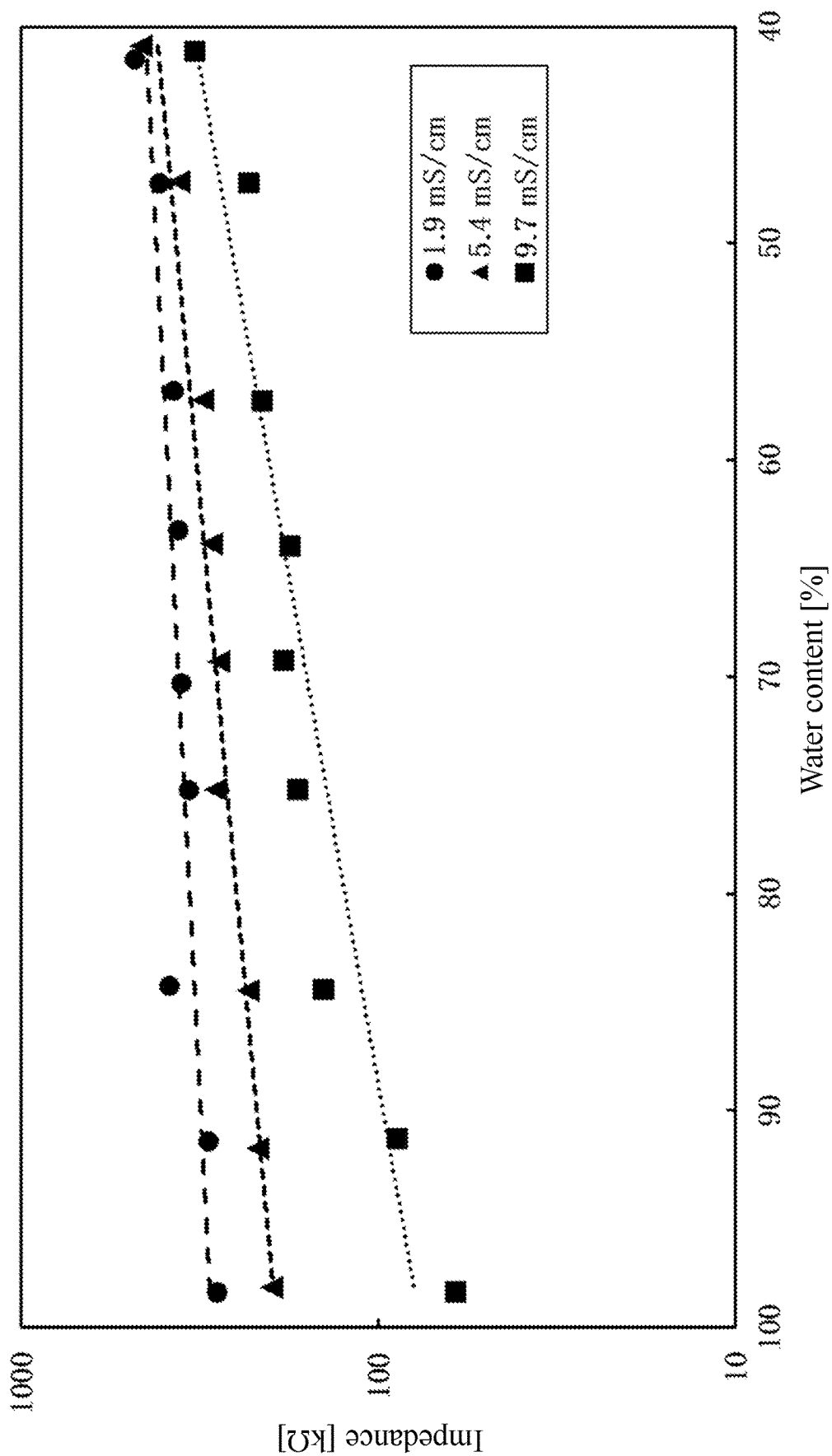
FIG. 11 is a graph illustrating relationships between water contents and impedance.
Figure 12:
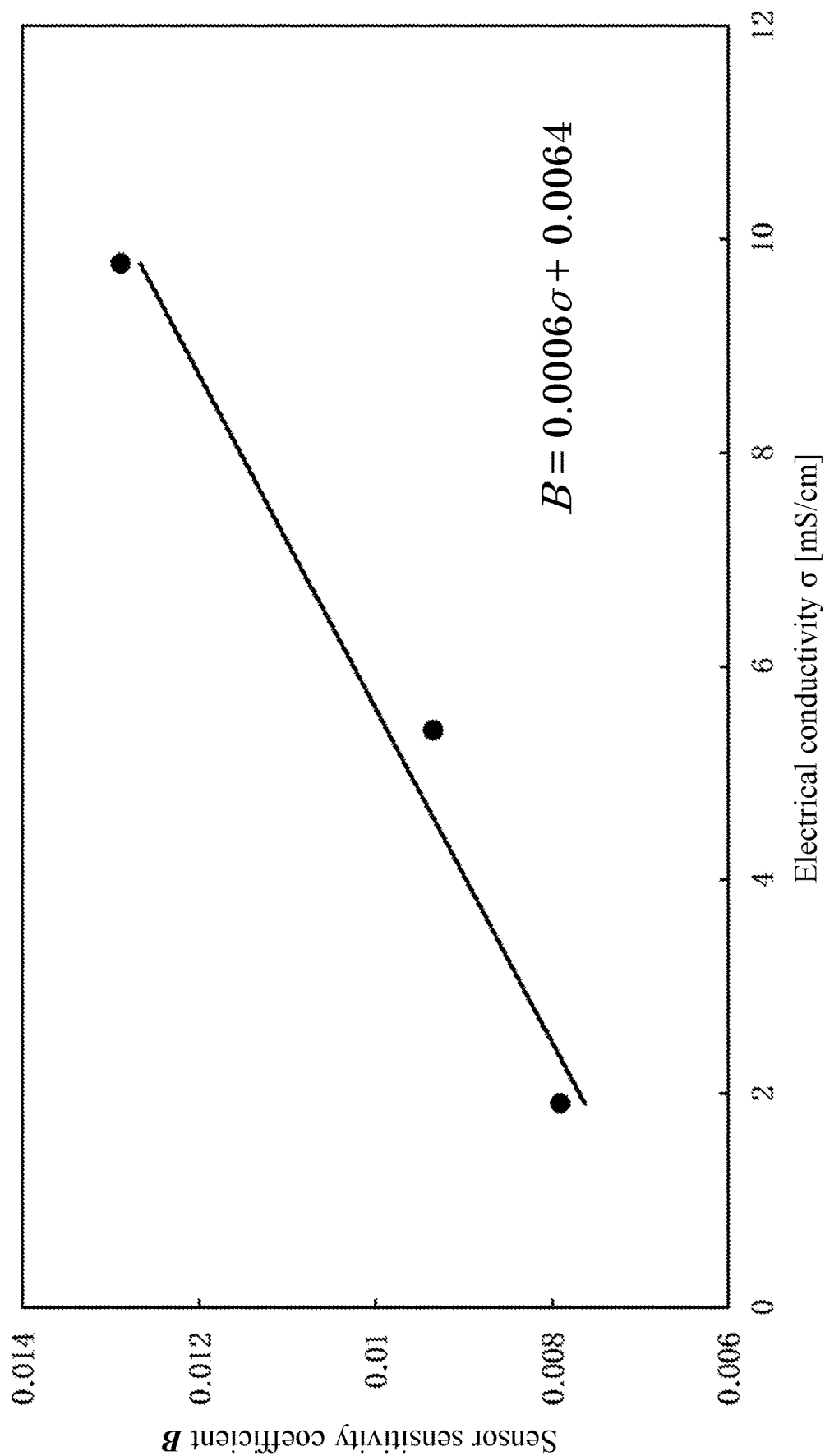
FIG. 12 is a graph illustrating a relationship between electrical conductivity and a sensor sensitivity coefficient.

The measurement points illustrated in FIG. 11 were fitted with Formula (1) to determine the sensor sensitivity coefficient B. FIG. 12 illustrates the relationship between the electrical conductivity σ of the KCl solution and the sensor sensitivity coefficient B. It can be seen that the electrical conductivity σ and the sensor sensitivity coefficient B are in the linear relationship from FIG. 12. The measurement points illustrated in FIG. 12 were fitted with the linear function and the respective coefficients in Formula (2) were determined to be a=0.0006 and b=0.0064 for the fabricated water content probe.

Thus, it has been confirmed that the water content measurement value obtained with the water content probe can be compensated with the electrical conductivity by determining the relational expression between the sensor sensitivity coefficient B and the electrical conductivity σ by, for example, a test in advance.

REFERENCE SIGNS LIST 1, 2, 3 plant water content sensor
10 supporting portion
20 water content probe
21 readout electrode pair
22 electrode
23 water sensitive film
30 electrical conductivity probe
31 electrical conductivity electrode pair
32 electrode
40 temperature probe
41 temperature sensor

The invention claimed is:

1. A plant water content sensor comprising:
a water content probe that includes a readout electrode pair made of
a pair of electrodes disposed at a predetermined interval thereof, and
a water sensitive film bridged across the pair of electrodes, wherein the water sensitive film is formed of lithium chloride or high-polymer material;
an electrical conductivity probe that includes an electrical conductivity electrode pair made of a pair of electrodes disposed at a predetermined interval thereof; and
a supporting portion being a plate that supports the water content probe and the electrical conductivity probe arranged in parallel to one another, the water content probe and the electrical conductivity probe being disposed in a cantilevered manner to one edge of the plate of the supporting portion, the water sensitive film of the water content probe being disposed from a location of the readout electrode pair to a partial region of the upper surface of the plate of the supporting portion and the water sensitive film being a water absorbing material.

2. The plant water content sensor according to claim 1, comprising
a temperature probe that includes a temperature sensor, wherein
the temperature probe is arranged in parallel with the water content probe and supported by the supporting portion.

3. The plant water content sensor according to claim 1, wherein
the water sensitive film is formed of polyimide.

4. The plant water content sensor according to claim 1, wherein
the water sensitive film has a hydrophilically treated surface.

5. The plant water content sensor according to claim 1, wherein
the water content probe has a tip angle of 40° to 60°.

6. The plant water content sensor according to claim 1, wherein
the electrical conductivity probe has a plurality of the electrical conductivity electrode pairs, and
the plurality of electrical conductivity electrode pairs are disposed to be arranged in an axial direction of the electrical conductivity probe.

7. The plant water content sensor according to claim 2, comprising
a heater-equipped temperature probe that includes a temperature sensor and a heater, wherein
the heater-equipped temperature probe is arranged in parallel with the temperature probe and supported by the supporting portion.

8. The plant water content sensor according to claim 1, wherein
the water content probe is a rod-shaped member supported in the cantilevered manner to the one edge of a plate of the support portion such that the water sensitive film is disposed on the pair of electrodes and also between the pair of electrodes bridging space between the pair of electrodes.

9. A plant water content measuring method comprising:
sticking a water content probe into a plant, the water content probe including a readout electrode pair made of a pair of electrodes disposed at a predetermined interval thereof, and a water sensitive film bridged across the pair of electrodes, the water sensitive film being a water absorbing material;
sticking an electrical conductivity probe into the plant, the electrical conductivity probe including an electrical conductivity electrode pair made of a pair of electrodes disposed at a predetermined interval thereof;
determining an electrical conductivity from an electrical resistance between the pair of electrodes constituting the electrical conductivity electrode pair;
determining in advance a sensor sensitivity coefficient B in Formula (1) from an electrical conductivity measurement value;
measuring impedance measurement value Z between the pair of electrodes constituting the readout electrode pair; and
determining a water content WC of the plant from the impedance measurement value Z based on Formula (1), $$Z = Z_0 \times 10^{-B \cdot WC} \tag{1}$$

here, Z indicates the impedance measurement value, $Z_o$ indicates an impedance determined in advance when no water is absorbed by the water sensitive film, and WC indicates the determined water content.

10. The plant water content measuring method according to claim 9, wherein
the sensor sensitivity coefficient B is determined from the electrical conductivity measurement value based on Formula (2), $$B = a\sigma + b \tag{2}$$

here, σ indicates an electrical conductivity, and a and b indicate coefficients determined in advance.

11. The plant water content measuring method according to claim 9, wherein
providing the support portion with a rectangular shape defining a plate with the water content probe and the electrical conductivity probe being disposed in a cantilever manner to one edge of the plate, the water content probe and the electrical conductivity probe being parallel to one another.

12. The plant water content measuring method according to claim 11, wherein
providing the water content probe such that the water sensitive film extends from the water content probe to a partial region of an upper surface of the support portion.

* * * * *